May 22, 1923.
B. B. FOGLER
CHEMICAL APPARATUS
Filed Sept. 18, 1920
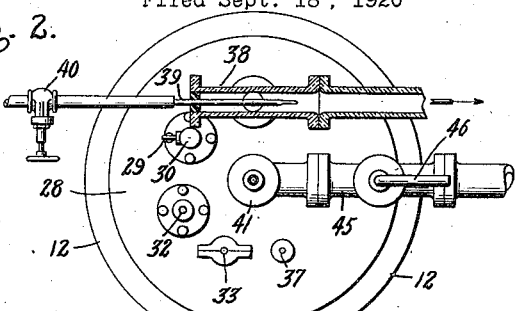
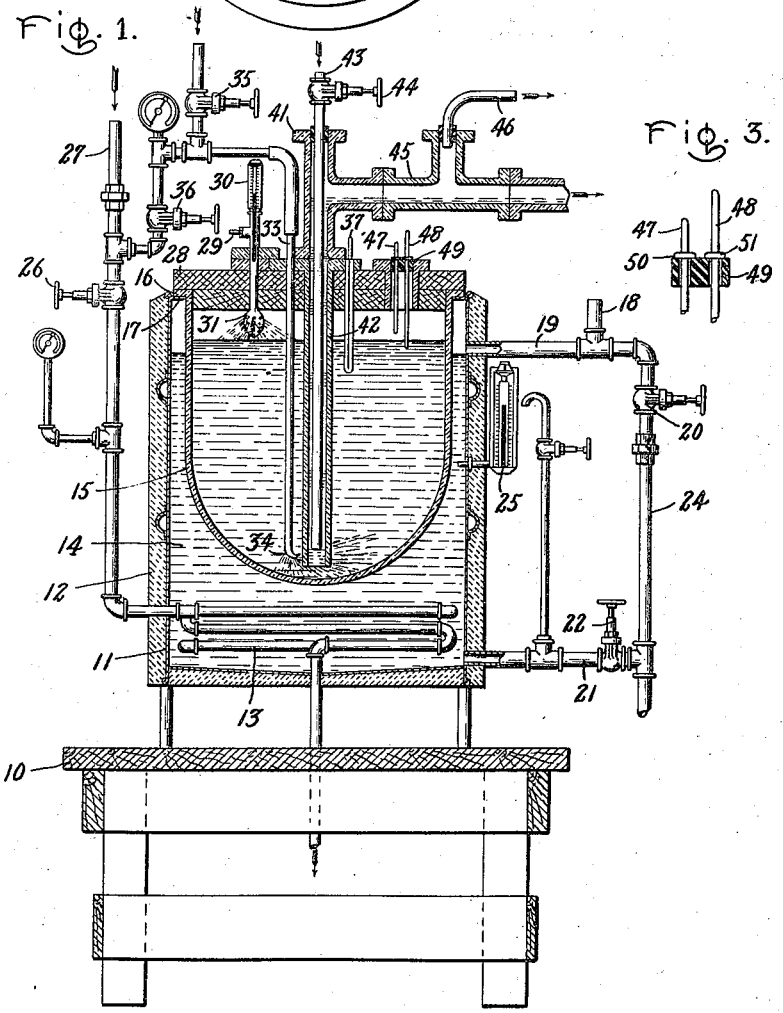

Patented May 22, 1923.

1,456,102

UNITED STATES PATENT OFFICE.

BEN BAKER FOGLER, OF CLEVELAND, OHIO, ASSIGNOR TO GENERAL ELECTRIC COMPANY, A CORPORATION OF NEW YORK.

CHEMICAL APPARATUS.

Application filed September 18, 1920. Serial No. 411,210.

*To all whom it may concern:*

Be it known that I, BEN BAKER FOGLER, a citizen of the United States, residing at Cleveland, county of Cuyahoga, State of Ohio, have invented certain new and useful Improvements in Chemical Apparatus, of which the following is a specification.

My invention relates to chemical apparatus and more particularly to apparatus to be used for precipitating operations.

My object is to produce a precipitation kettle which may be evenly heated and readily kept at a constant temperature and into which may be run the chemicals involved and from which the precipitate and solution may be drawn all of which may be done continuously and practically automatically.

The apparatus of my invention, although not limited thereto, is used in connection with a continuous process for the production of tungstic oxide from a tungsten ore which is disclosed in the application of F. M. Dorsey, Serial No. 411,166, filed September 18, 1920. In the continuous process a solution containing a soluble compound of tungsten is run into the kettle simultaneously with the precipitating solution and the precipitate and mother liquor are drawn off so as to maintain a fairly constant level of solution in the kettle.

In the accompanying drawing, Fig. 1 is a sectional elevation of precipitation apparatus embodying my invention; Fig. 2 is a top plan view of the same; and Fig. 3 is a fragmentary detail of the level gauges.

Referring now to the drawing, the base 10 supports a container 11 which is covered on the outside with magnesia bricks 12 or other heat retaining material. A steam coil 13 inside and near the bottom of the container 11 serves to heat the liquid 14 in the container 11 and surrounding the stoneware precipitation kettle 15 which is received inside the container, the flange 16 of the kettle being supported on the flange 17 at the top of the container. For the liquid 14, I prefer to use some material from which the contents of the precipitation kettle 15 may be recovered should the kettle crack or break and I have selected a solution of calcium chloride as suitable. The liquid 14 is introduced into the container through the vent 18 and pipe 19 the valve 20 being closed. The pipe 21 with valve 22 is used to drain the liquid from the container and the pipe 19 with the valve 20 and pipe 24 serves as an overflow for the liquid 14. A thermometer 25 inserted through the side of the container 11 gives an indication of the temperature of the liquid 14 which may be regulated by adjusting the valve 26 in the steam supply pipe 27 leading to the heating coil 13.

The stoneware kettle 15 is closed with a wooden cover 28 through which passes the pipe 29 leading to the supply of the tungsten compound solution which, in the Dorsey application previously referred to, is sodium tungstate solution with which has been mixed a solution of sodium nitrate. A thermometer 30 inserted in the pipe 29 indicates the temperature of the solution entering the kettle. A nozzle 31 fastened to the inner end of the pipe 29 sprays the incoming solution. The precipitating solution, in this case hydrochloric acid, is brought from the supply and, through the pipe 32 (see Fig. 2), passes into the kettle 15.

The precipitate formed during the reaction tends to settle somewhat rapidly and in order to prevent this, I have provided an agitator which consists of a pipe 33 extending through the cover 28 nearly to the bottom of the kettle and having on its lower end a nozzle 34. The pipe 33 is connected to a source of high pressure air controlled by the valve 35 and to a steam supply controlled by the valve 36 so that either or both may be used. Steam agitation would be desirable should the temperature of the solution in the kettle 15 as indicated on the thermometer 37, which is supported through the cover 28, fall below that preferable for the precipitating operation. In order to remove from the kettle the air or steam blown in by the agitator and any gases which may be formed during precipitation, I have inserted the T-shaped pipe 38 (see Fig. 2) through the cover 28 and, in one end of the T, I have sealed an air ejector 39 which is connected to a source of high pressure air and controlled by the valve 40. The other end of the T is open to the atmosphere.

The precipitate and fluid or mother liquor are withdrawn from the kettle 15 preferably from near the bottom thereof in order to make sure that a substantially complete reaction has taken place. The withdrawal is accomplished preferably by elevating the precipitate and liquor from the solution in the kettle 15. Furthermore, it is desirable that the level in the kettle be maintained fairly constant by the withdrawing means which should also be substantially automatic in its action.

For these reasons, the precipitate and solution are continuously withdrawn from the kettle 15 preferably by means of an air-lift 41 which comprises a long tube 42 centered in the cover 28 and extending nearly to the bottom of the kettle and in which is centered the air tube 43 which extends nearly to the lower end of the tube 42 and is sealed in the upper end thereof.

The air tube 43 is connected to a source of high pressure air and controlled by the valve 44. Connected to the tube 42 and near the upper end thereof above the cover 28 is the exit tube 45 which conducts the precipitate and solution carried up the tube 42 around the air tube 43 to the settling and washing tanks. An air vent 46 in the exit tube 45 permits the air from the air lift to escape to the atmosphere.

The level gauges 47 and 48 (Fig. 3) are inserted through holes in the cork 49 which is held by the cover 28 and are used to check the level of the solution in the kettle 15. Buttons 50 and 51 are provided on the respective gauges 47 and 48. The gauge 48 extends further into the kettle 15 than does the gauge 47. The agitation of the liquor in the kettle 15 by the agitator is so great that the surface of the liquor is continually in motion. This motion of the liquor is transmitted to the gauge inserted therein and, the holes in the cork 49 being larger than the smaller diameter of the gauges, the quiver of the gauge affected may be noted above the cover 28. If neither gauge 47 nor 48 move, the solution is too low; if both move, it is too high; and, if gauge 48 moves and gauge 47 is still, the level of the solution is at the desired height.

In operation, the solution 14 is preferably heated to about the temperature desirable for the precipitation reaction and then the sodium tungstate solution and hydrochloric acid are run into the kettle 15 through their respective pipes and in proper proportion which may be determined from venturi meters inserted in the respective pipes. It may be necessary to use steam agitation to bring the solution in the kettle 15 to the proper temperature which is read on the thermometer 37. When the solution in the kettle has reached a level between that indicated by the level of the gauges 47 and 48, the valve 44 controlling the air supply of the air tube 43 is opened and adjusted so that the amount of precipitate and solution drawn off by the air lift is substantially equal to the amount of the incoming solutions. When once adjusted the air lift tends to automatically maintain the level of the solution in the kettle between the limits of the gauges 47 and 48 even though the amount of the incoming solutions should be temporarily increased or decreased.

While I have shown and described a specific embodiment and application of my invention, I do not wish to be limited thereto as various modifications and applications thereof will readily suggest themselves to those skilled in the art.

What I claim as new and desire to secure by Letters Patent of the United States, is:—

1. A chemical precipitation apparatus comprising a kettle, conduits leading thereinto for reagents which will react to produce a precipitate, a delivery tube extending upwardly from the lower portion of said kettle and having an open end aperture disposed above the bottom of said kettle, and another tube extending through said delivery tube into said kettle and having an end aperture smaller in diameter than said delivery tube and located adjacent to the lower end thereof.

2. A chemical precipitation apparatus comprising a kettle, and a cover therefor, having extending therethrough conduits for the reagents which will react to produce a desired precipitate, and a delivery tube extending from the bottom portion of said kettle upwardly through said cover, another tube extending into said kettle and having an end aperture smaller in diameter than that of said delivery tube and located adjacent to the lower end thereof, and means for supplying air pressure thereto.

In witness whereof, I have hereunto set my hand this thirteenth day of September, 1920.

BEN BAKER FOGLER.